2,754,267
CARBON BLACK CONCENTRATES

Arnold A. Bondi, Oakland, Calif., assignor to Shell Development Company, New York, N. Y., a corporation of Delaware No Drawing. Application July 12, 1954,
Serial No. 442,917

5 Claims. (Cl. 252—29)

The present invention relates to improved suspensions of carbon black. More particularly, it is concerned with fluid carbon black suspensions, as distinguished from carbon black grease compositions.

Carbon blacks have been employed in conjunction with oils for the preparation of grease compositions and the like. Moreover, carbon blacks have been utilized for the preparation of luminescent flames by injection together with fuel oil for use in steel mill furnaces and similar situations where highly radiant flames are desired. An improvement in the latter process comprises metering concentrates of carbon black into the main fuel oil stream so that, by varying the ratio of carbon black concentrate to the main body of the fuel oil, the radiation of the flame likewise can be varied.

It was expedient to employ for this purpose a fuel oil as the suspending medium for the preparation of the carbon black concentrates. However, it was soon found that the use of such an oil limited the maximum carbon black concentration which could be made and still retain a fluid pumpable composition. This was true especially when the relatively finely divided carbon blacks were being utilized. The same problem did not appear to exist when the relatively coarser carbon blacks were being used. In the latter instance, fuel oils or other petroleum products containing asphaltogenic materials and the like were fully as satisfactory as more refined products for the preparation of carbon black concentrates. On the other hand, when the fine carbon blacks, such as acetylene black, were utilized, fuel oils were definitely unsatisfactory since (apparently due to their asphaltogenic content) gelling of the composition occurred at a relatively low concentration: in the order of 3–5%, whereas concentrates of 10–50% were desired.

The use of the finely divided carbon blacks for the purpose of increasing flame radiation is desirable due to the fact that the fine carbon blacks have a relatively greater surface area and thereby enable the production of maximum flame radiation when they are combined with fuel oil and burned. Consequently, it would be desirable to produce compositions which enable the production of highly concentrated carbon black suspensions prepared from the relatively finely divided carbon blacks while at the same time maintaining fluidity of the concentrate.

It is an object of the present invention to improve the production of carbon black concentrates. It is a second object of this invention to produce carbon black concentrates which are fluid and pumpable. It is another object of the invention to produce relatively concentrated suspensions of finely divided carbon blacks. It is a further object of the invention to improve the process of steel furnace operation for the purpose of producing highly radiant and controllable flames. Other objects will become apparent during the following discussion.

Now, in accordance with this invention, it has been found that highly concentrated suspensions of carbon blacks which are fluid and pumpable at ambient temperatures comprise a mineral oil containing less than about 5% (preferably less than 3%) of polar components (compounds) capable of complex formation with mercuric chloride, said oil acting as the suspending medium for the carbon blacks, at least about 10% of the surface of said carbon blacks bearing at least about a unimolecular surface coating of copolymers formed between essentially straight-chain alpha-olefin hydrocarbons having 8 to 40 carbon atoms per molecule and hydrolyzable polar vinyl compounds.

More particularly, such carbon black suspensions preferably comprise refined mineral oils, preferably lubricating oils, containing about 5% and 50% by weight of carbon black particles, the smallest average diameter of which is less than about one micron. The invention applies especially to those carbon blacks wherein the average surface area is greater than about 10 square meters per gram. The use of the present invention enables the production of fluid concentrates of the more finely divided carbon blacks and thus enables the production of more highly radiant flames in such furnaces as steel mill furnaces.

While the present compositions enable especially the preparation of carbon black concentrates wherein the carbon blacks are of the relatively small particle size, it applies likewise to carbon blacks of coarser varieties. The compositions so prepared have viscosities substantially lower than when other suspending media are employed in the absence of the dispersing agent described hereinafter. While the concentrate may comprise from about 5% to about 75% by weight of carbon black, preferably they contain between about 10% and about 50% by weight of carbon black.

The carbon blacks utilized in these concentrates are preferably those presenting a large exposed surface area so that the greatest radiation may be obtained by their burning. Thus, it will be seen that relatively coarse particles, namely solid fuel particles, having average minimum particle diameters greater than about 2 microns will not be desirable although the actual steps of the process may be employed if their radiation effect is not of primary importance. Preferably, the carbon blacks employed have average particle diameters less than about 1 micron and more preferably between about 0.02 and about 0.8 micron. Best results are obtained by the use of carbon blacks having average diameters between about 0.4 and about 0.6 micron. It will be understood when average particle diameter is referred to in the present specification and claims that the average diameter of the shortest particle dimension is meant. Due to the fact that the preferred carbon black particles are anisometric in shape (thus producing the maximum surface areas), the smallest particle diameter is that referred to herein, since the thickening properties of carbon blacks appear to depend primarily upon this minimum dimension.

In the production of the subject carbon black concentrates, it was discovered that hydrocarbon oils containing more than about 5% of asphaltogenic materials apparently caused linking together of the carbon black particles and thus created a gel structure at a relatively low carbon black content. Hence, this type of suspending medium is to be avoided in the production of the subject suspension. By "asphaltogenic substances" is meant that portion of the hydrocarbon oil (i. e. mineral oil) capable of reacting with saturated aqueous mercuric chloride solution at room temperature within a space of about 10 minutes to form solid complexes removable by filtration. Preferably the mineral oil contains less than about 3% of asphaltogenic materials (still better, less than 1%) and has a viscosity within the range from ordinary kerosenes to ordinary residual fuel oils. Still more preferably, in addition to these two ranges of asphaltogenic content and viscosity characteristics, the mineral oil has a boiling range of lubricating oils and fuel oils. Specifically, the mineral oils contemplated for use in the present invention comprise refined kerosene, stove oil, gas oil, lubricating oils and fuel oils wherein the asphaltogenic content is below the maximum figures specified above.

When suspensions are made from the subject refined mineral oils and carbon blacks, especially of the more finely divided types, grease-like compositions are obtained if the subject class of dispersing agents is not present. Consequently, an essential component of the present compositions comprises the oil-soluble copolymeric materials now to be described. These materials are to be employed in concentrations such that at least about a unimolecular layer of the copolymer is present on at least about 10% of the surfaces of the carbon black particles. The precise quantity will thus vary with the surface area of the carbon black particles and with the concentration thereof in the suspension. Normally, however, they will be present in amounts varying from about 0.5% to about 10% by weight of the carbon black or from about 0.025% to about 5% based on the weight of the total concentrate. Preferably, they are present in amounts from about 1% to about 5% by weight of the carbon black or in proportions between about 0.05% and about 2% based on the total concentrate.

The copolymers are suitably prepared as hydrolyzed or alcoholized copolymers of straight-chain alpha-olefin hydrocarbons containing from 8 to 40 (preferably 12–30) carbon atoms per molecule with hydrolyzable vinyl compounds including vinyl halides (vinyl chloride) and vinyl esters (vinyl acetate) and comparable copolymers of the same type of straight-chain alpha-olefins with other low molecular weight polymerizable polar substituted alpha alkenes, such as the acrylo compounds as illustrated by acrylic acid, acrylonitrile, acrylamide, methacrylic acid, methacrylonitrile, methacrylamide, as well as mixtures and derivatives thereof.

In the formation of the polymeric compounds to be used in this invention, one of the essential reactants is an alpha-olefin (normal or branched-chain) containing at least 8 carbon atoms per molecule. These alpha-olefins can have from 8 to 40 carbon atoms, the alpha-olefins containing from 12 to 30 carbon atoms being preferred. Illustrative of such olefins are the alpha isomers of the following: octene, nonene, decene, undecene, dodecene, tridecene, tetradecene, pentadecene, hexadecene, heptadecene, octadecene, nonadecene, eicosene, heneicosene, docosene, tricosene, tetracosene, pentacosene, hexacosene, henheptacosene, octacosene, nonacosene, triacontene, hentriacontene, dotriacontene, tritriacontene, tetratriacontene, pentatriacontene, hexatriacontene, heptatriacontene, octatriacontene, nonatriacontene, tetracontene, pentacontene, hexacontene, and heptacontene. These olefinic materials can be obtained, for example, by cracking paraffin waxes, as is well-known in the art.

The polar-containing polymerizable compound utilized in the copolymerization should contain the polar radical which it is desired to have in the finished product, or it should contain a polar radical or group which after copolymerization is readily convertible, as by hydrolysis, oxidation, reduction, amidation or dehydration, or other suitable reaction, to the desired polar group. This polar group should be attached directly to one of the ethylenic carbon atoms or to such ethylenic carbon atom through a single carbon atom.

In the formation of polyol compounds to be used in the oil compositions, as by hydrolysis of, for example, suitable copolymers of alpha-alkenes with a suitable vinyl compound, the vinyl compound is suitably an ester of lower molecular weight acids, such as vinyl formate, vinyl acetate, vinyl propionate, vinyl butyrate, vinyl benzoate, etc., a vinyl halide, such as vinyl chloride or a vinyl pyridine. Other copolymers of this invention can be formed by reacting the alpha-olefins with acrylo compounds containing a polar functional group, such as acrylonitrile, acrylamide, acrylic acid and homologs thereof, e. g. methacrylonitrile, alpha-ethyl acrylonitrile, alpha-propyl acrylonitrile, 2-butyl-2-hexenenitrile, 2-propyl-2-pentenenitrile, 2-chloroethyl - 2 - butenenitrile, 2 - ethyl - 3 - chloro - 2 - butenenitrile, 2 - isopropyl - 3 - bromo - 2 - pentenenitrile, alpha-isopropyl beta-cyclohexyl acrylonitrile, corresponding amides and aminoamides and the like.

As in the ratio of polar to nonpolar groups in the compounds to be used in the oil composition of the invention, the ratio of molar proportions of the reactants can be varied over wide limits such as 0.1 to 10, preferably, 0.5 to 5 moles, of the polar olefinically polymerizable compound to the essentially nonpolar alpha-olefin.

Catalysts suitable for use in making these copolymers comprise peroxides, such as the various organic peroxides including aliphatic, aromatic, heterocyclic and alicyclic peroxides, such as diethyl peroxide, tertiarybutyl hydroperoxide, dibenzoyl peroxide, dimethylthienyl peroxide, dicyclohexyl peroxide, dilauroyl peroxide and urea peroxide. The reaction can also be catalyzed by high energy radiation ($\gamma$-rays, X-rays, etc.). Suitable products include the copolymer of alpha-octadecene and vinyl acetate wherein the vinyl acetate-octadecene ratio is 1 to 1.2 moles, the product being alcoholized and having an average molecular weight of about 8,000. The catalyst employed may, for example, be benzoyl peroxide and the conditions of copolymerization may be about 80° C. for about 24 hours. The alcoholizing agent may be methanol containing a trace of metallic sodium. A second typical product comprises the hydrolysis product of alpha-hexadecene and vinyl acetate wherein the ratio of vinyl alcohol to hexadecene is approximately 2:1 moles. The average molecular weight was about 6,000. Another typical group of copolymers comprise those of alpha-octadecene with acrylonitrile, acrylic acid or acrylamide wherein the molar ratio of octadecene to the acrylic compound was approximately 4:1. Further examples of typical copolymers comprise the following: $\alpha$-heptadecene-vinyl acetate, $\alpha$-tetradecene-vinyl acetate, $\alpha$-eicosene-vinyl acetate, $\alpha$-octadecene-vinyl propionate, $\alpha$-octadecene-vinyl butyrate, $\alpha$-octadecene-vinyl benzoate, mixture of $\alpha$-tetradecene and octadecene-vinyl acetate, cracked wax $C_8$–$C_{14}$ $\alpha$-olefin mixture-vinyl acetate, $\alpha$-docosene-vinyl acetate, $\alpha$-heptadecene-acrylonitrile, $\alpha$-tetradecene-acrylonitrile, $\alpha$-octadecene-methacrylonitrile, $\alpha$-octadecene-$\alpha$-ethylacrylonitrile, $\alpha$-eicosene-acrylonitrile, $\alpha$-tetradecene-acrylamide, cracked wax $C_{14}$–$C_{18}$ $\alpha$-olefin mixture-acrylamide, $\alpha$-paraffin wax olefin-acrylic acid, and mixture of $\alpha$-octadecene and $\alpha$-tetradecene-acrylonitrile.

The carbon black concentrates constituted as described hereinbefore as especially useful for injection as discussed previously together with fuel oil into furnaces such as open hearth steel furnaces, lime and cement kilns, melting furnaces, tube still furnaces, cracking furnaces and the like, all of which types largely depend upon radiant heat transfer.

A specific application of the use of such concentrate comprises the operation of an open hearth furnace for the purpose of steel manufacture wherein a concentrate of carbon black is injected into a fuel stream immediately prior to combustion thereof within the open hearth furnace and during the charging and melting stages of the steel manufacture. During the refining stage, wherein no heat elevation is required but temperature maintenance is necessary, the carbon black injection may be reduced or entirely stopped. A still further refinement in the present use of these concentrates comprises maintaining the total fuel input substantially constant throughout the steel-making process thus maintaining the flame profile substantially unaltered during the same period, but varying the radiation characteristics thereof by variation in carbon black concentrate injection.

Under ordinary conditions of operation, it is preferred to inject from about 0.5% to about 7.5% by weight of carbon black based on the total fuel being burned in the furnace during those periods when increased radiation of the burning flame is desired. This corresponds roughly on a B. t. u. basis to 0.5–7 pounds of carbon black per two thousand standard cubic feet of gaseous fuel. The carbon black concentrates may be injected in fuel oil as suggested above or may be added to other furnace fuels including gases and mixtures of such materials, such as residual fuels (straight-run and cracked distillation or flashing bottoms), distillates such as straight-run gas oil, light and heavy catalytically cracked gas oils, thermally cracked gas oils, thermal and catalytic reforming bottoms, kerosene and various natural and refinery gases employed for heating such furnaces. The incorporation of carbon black into the fuel oil as described above for the heating of an open hearth furnace during the charging and melting stages but omitted during the refining stage causes as much as a 10% reduction in total cycle time for a batch of steel.

The following examples illustrate the preparation and properties of the subject carbon black concentrates:

Example I

A copolymer of n-octadecene-1 and vinyl alcohol having a ratio of 1 mole octadecene to 3 moles of vinyl alcohol and an average molecular weight of 15,000 was dissolved in a refined mineral lubricating oil by warming to about 125° C. for about ten minutes. The lubricating oil had the following characteristics:

Viscosity at 30° C _____ 240 centistokes.
Viscosity at 100° C _____ 10 centistokes.
Per cent reacting with saturated aqueous mercuric chloride _____ Less than 0.2%.

Two parts of the copolymer were dissolved in 78 parts of mineral lubricating oil. To this was added 20 parts by weight of acetylene black having an average particle size diameter of about 30 m$\mu$. This mixture was ball-milled for about 2 hours at about 75° C. and resulted in a very fluid suspension. In the absence of the copolymer, the suspension of acetylene black and refined mineral oil became substantially solid at about 8% acetylene black.

An attempt was made to form an acetylene black concentrate in a fuel oil having an asphaltogenic content of about 30% by weight, as determined by the per cent of material which would react with saturated aqueous mercuric chloride at room temperature. Even in the presence of the same proportions of oil and copolymer, the composition became solid at approximately 4% acetylene black. This situation was not remedied by increasing the proportion of the copolymer.

Example II

Another concentrate may be prepared by dissolving a copolymer of 1 mole hexadecene and 2.5 moles vinyl acetate, hydrolyzed with ethyl alcohol in a refined gas oil to form a solution comprising 75 parts of gas oil and 5 parts by weight of the copolymer (which had an average molecular weight of about 9,000). To this was added a carbon black having an average particle size diameter of about 20 m$\mu$ to form a composition comprising 35% by weight of carbon black, the remainder being the 5% solution of the copolymer in the gas oil. This mixture was subjected to ball milling for approximately 4 hours at about 60° C. to form a very fluid suspension. The gas oil had the following properties:

Viscosity at 20° C _____ 5 centistokes.
Density at 20° C _____ 0.850.
Reactive with saturated aqueous mercuric chloride solution _____ Less than 0.1%.

It was determined that in the preparation of the present concentrates it was highly desirable to employ ball-milling as the means of creating a dispersion of acetylene black or other carbon black in the refined mineral oils. Moreover, the optimum temperature for operating the ball mill was between about 50 and about 100° C. (preferably between about 60 and about 80° C.), for a period of time between about ¼ hour and about 5 hours. The optimum conditions employed will vary with the carbon black, the oil and the copolymer, as well as with the proportions of each of these ingredients.

Example III

In utilizing the concentrate prepared as described in Example I, the concentrate was heated to a temperature of about 180° F. by means of a steam coil and stirred to maintain uniformity while injection into a fuel oil line immediately ahead of the fuel oil meter. Ninety pounds of air per square inch were employed for atomizing the total fuel charge. The total fuel (including carbon) rate was 5 gallons per minute and the carbon black—lubricating oil concentrate—was injected at a rate of about 4 pounds per minute. A total steel charge of about 76 tons may be utilized in a typical run, about one-half of the amount (heavy melting scrap) being charged initially with about 2 approximately equal additional charges added subsequently after partial melting of the first portion of the charge. In conducting the melting process it was found that the presence of the above proportion of acetylene black reduces the charge to tap time by approximately 25%.

This case is copending with patent application Serial No. 357,374, filed May 25, 1953, in the names of Arnold A. Bondi and Lawrence B. Scott, now abandoned.

I claim as my invention:

1. A fluid carbon black suspension comprising a refined mineral oil having a viscosity and boiling point in the lubricating and fuel oil range and containing less than about 5% of polar substances reactive with aqueous mercuric chloride, said oil having suspended therein between about 10% and about 40% by weight, of the total suspension, of carbon black particles, the shortest diameter of which is less than about 1 micron average, at least about 10% of the surface area of said particles bearing at least about a unimolecular coating of an oil-soluble hydrolyzed copolymer, the copolymer resulting from the copolymerization of a straight chain alpha-olefin hydrocarbon containing between about 12 and about 30 carbon atoms per molecule with between about 0.5 and 5 moles, per mole of alpha-olefin, of a vinyl ester selected from the group consisting of vinyl formate, vinyl acetate, vinyl propionate, vinyl butyrate and vinyl benzoate, said copolymer having a molecular weight between about 4000 and about 15,000.

2. A fluid carbon black suspension according to claim 1, wherein the carbon black particles are anisometric and the mole ratio of the vinyl ester to the alpha-olefin is between about 1 and about 3, respectively.

3. A fluid carbon black suspension according to claim 1, wherein the mineral oil is a lubricating oil containing less than 1% by weight of asphaltogenic materials and the carbon black has a surface area greater than about 10 square meters per gram.

4. A fluid carbon black suspension according to claim 1, wherein the copolymer results from the copolymerization of an alpha-olefin having between 12 and 30 carbon atoms per molecule with between 1 and 3 moles, per mole of alpha-olefin, of vinyl acetate.

5. A fluid carbon black suspension comprising a refined mineral lubricating oil having less than about 5% of asphaltogenic materials therein, said oil having suspended therein between about 10% and about 40% by weight of acetylene black particles, at least 10% of the surface area of said particles bearing at least about a unimolecular coating of an oil-soluble hydrolyzed copolymer resulting from the reaction of straight-chain alpha-hexadecene with 2.5 moles, per mole of hexadecene, of vinyl acetate, said copolymer having an average molecular weight of about 9,000.

References Cited in the file of this patent

UNITED STATES PATENTS

| | | |
|---|---|---|
| 1,770,181 | Morrell | July 8, 1930 |
| 2,200,429 | Perrin | May 14, 1940 |
| 2,213,423 | Wiezevich | Sept. 3, 1940 |
| 2,421,971 | Sperati | June 10, 1947 |
| 2,668,757 | Hansley | Feb. 4, 1954 |